July 30, 1957     W. A. BARNES     2,801,402
JOINT STRUCTURE
Filed March 20, 1953
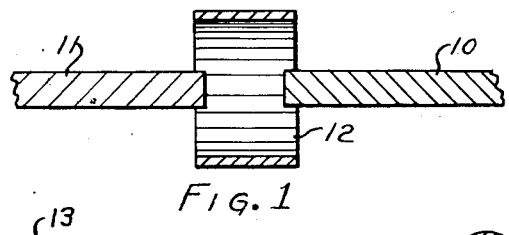
FIG. 1
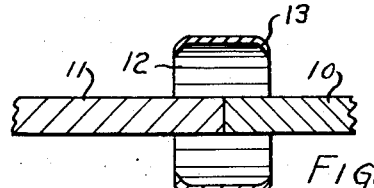
FIG. 2
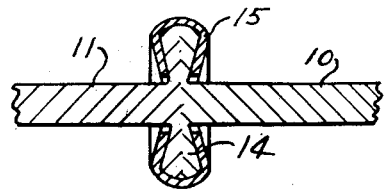
FIG. 3
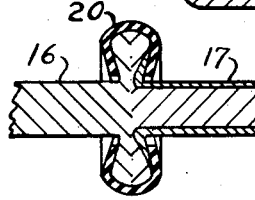
FIG. 4
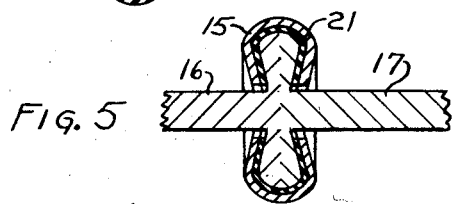
FIG. 5
FIG. 10
FIG. 11
FIG. 6
FIG. 7
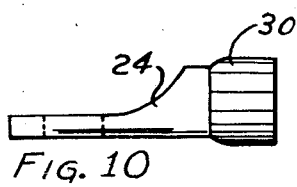
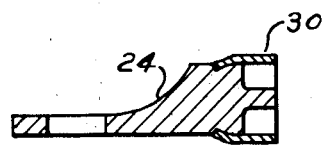
FIG. 12
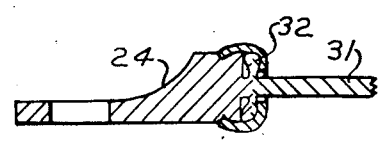
FIG. 8     FIG. 9
INVENTOR.
William A. Barnes
BY Woodling and Kroost
ATTORNEYS United States Patent Office 2,801,402
Patented July 30, 1957

2,801,402

JOINT STRUCTURE

William A. Barnes, Utica, N. Y., assignor to Utica Drop Forge & Tool Corporation, a corporation of New York Application March 20, 1953, Serial No. 343,745

12 Claims. (Cl. 339—275)

This invention relates in general to uniting of metal members by cold pressure uniting or welding of the metal structures under controlled conditions of pressure and confined flow of metal, and relates more specifically to the method and means for reinforcing the union and resisting electrically induced corrosion between dissimilar metals in such union.

This application is generic and related to later filed applications 359,159 and 568,306.

The union of two metallic members by the use of controlled cold flow of the metal structures, is a relatively recent accomplishment insofar as reducing the basic principles to a practical and usable procedure is concerned. It has long been known that metal can flow at room temperature under proper conditions of loading. It is possible that the uniting, or welding, of two metal objects by controlled application of high pressures at room temperature has been known. However, the reduction of this knowledge to a practical level has only recently been accomplished. United States Patent No. 2,522,408 was granted to Sowter for his development in cold pressure welding.

The cold pressure method of uniting two metallic members such as wires, or a wire to a terminal, produces a lateral flange. Although it has been conclusively proven that such cold pressure method of uniting is entirely capable of producing a union which is stronger than either of the original metal members, nevertheless, it is conceivable that a union may occassionally be produced which is not perfect because of improper cleaning of the surfaces prior to uniting the members, or for some other reason, and therefore, the union could possibly break apart. The quality of such unions has been demonstrated, when the union is properly made, by shearing away the lateral flange and placing the union under tension. One or the other of the original members will usually break and leave the union intact. In fact, such unions have been drawn by passing the united members through wire reduction dies, and the union is undetectable in the finished wire. Generally, however, the flange is allowed to remain on the union.

Some metals will actually diffuse in such manner that a polished section of the union will not reveal a distinct junction between the two original members. Other metals have a distinct line dividing the original members. It has not definitely been determined what the nature of the union is in this line. It is definitely established, however, that an exceptionally strong union is produced between the two original members whether or not there is an actual diffusion. It is not the concern of the present invention whether the union is achieved by actual diffusion or some other phenomena of metal union, but rather with the results obtained. Accordingly, in this specification, and in the claims, reference will be made to a union between members caused by controlling cold flow of the metal structures, or to a cold weld. It is not intended that this invention should be limited by the choice of words to describe the junction between the members.

Therefore, an object of this invention is to provide a cold pressure-formed butt union of metal members in end-to-end relationship with a lateral flange at the union, and a reinforcing clamp clipped tightly over the flange to hold the union against any tendency to separate.

Another object of this invention is to provide the clamp in air sealing relationship over the peripheral edge of the flange where the two metals are cold pressure welded and also exposed to atmosphere.

Still another object of this invention is to provide the clamp of insulating material, or metal with insulation material between the flange and clamp, to prohibit free flow of electrons from one metal to the other through the clamp.

And another object of this invention is to provide a reinforcement for a union between a terminal and a wire.

Other objects and a fuller understanding of the invention may be had by referring to the following description and claims, taken in conjunction with the accompanying drawing, in which:

Figure 1 is a sectional view through two wires and a metal shell in the position in which they are placed in a suitable tool prior to driving the wires together under proper conditions of pressure and confinement, and simultaneously folding the shell upon the union;

Figure 2 is a view of the wires and the shell at the position where the wires have just been brought into contact by the tool and the shell has begun to fold;

Figure 3 is a sectional view through the completed union of the wires, including the flange produced by the cold pressure method, and the shell wrapped tightly into peripheral engagement as a clamp member upon the flange;

Figure 4 is a view similar to Figure 3 wherein the clamp member is composed entirely of insulation material, and one wire is copper coated aluminum wire;

Figure 5 is a view similar to Figure 3 wherein the clamp is metal as shown in Figure 3 with an insulation liner between the clamp and the flange;

Figure 6 is a side view of an improved terminal member having a suitable end structure for uniting with a wire and simultaneously clamping the union to the terminal;

Figure 7 is a top view of the terminal of Figure 6;

Figure 8 is a fragmentary portion of the terminal showing the end structure and a wire in position for uniting similar to the position shown in Figure 1;

Figure 9 is a sectional view of the union between the wire and terminal end completed and clamped by the shell of the terminal member;

Figure 10 is a side view of a single end terminal member having a separately applied shell;

Figure 11 is a longitudinal sectional view through the terminal of Figure 10; and Figure 12 is a sectional view of the terminal as shown in Figure 11 but with a wire united and clamped in a reinforced union with the terminal member.

Referring now to the drawing, the method of uniting two metallic members, illustrated as wire 10 and 11, is set forth diagrammatically in Figures 1 through 3. In Figure 1 the wires 10 and 11 are positioned in the relationship they attain in a suitable tool for producing the cold pressure weld. A metallic shell ring 12 is in the position which it assumes prior to the uniting process. Note that the wires 10 and 11 are aligned to abut one another centrally within the shell 12.

In Figure 2 the wires have been brought into contact by the tool, and the tool has caused the shell 12 to begin to round at the corners, as indicated by the reference character 13.

In Figure 3 the union has been completed and a flare 14 produced. The shell has been tightly clamped upon the flare 14 and serves as a clamp to aid in strengthening the union and prevent any tendency for the union to part. The finished clamp is referred to by reference character 15.

There are instances in which it is necessary to remove the flange produced during the cold pressure method of joining the wires, but in most instances this flange can remain and be clamped as shown and described.

In Figure 4 of the drawing there is illustrated a joint similar to that shown in Figure 3, but the clamp is indicated as being made entirely of insulation material, as shown by the reference character 20, and one wire is copper sheathed aluminum.

In Figure 5 the clamp is of metal, and is referred to by the same reference character 15 as that shown in Figure 3, but a lining of insulation material 21 is placed between the surfaces.

The use of insulation material as a clamp, or the provision of an insulated lining for a metal clamp, has been found to be extraordinarily beneficial in preventing corrosion which is usually inherent whenever two dissimilar metals are brought intimately into contact under atmospheric conditions.

In Figures 4 and 5 the wires are referred to by the reference characters 16 and 17, and are intended to specify two dissimilar types of wire, for example copper and aluminum with copper coating. It is often desirable to bring a copper and aluminum wire together, but heretofore a practical union between such dissimilar metals was impractical if not impossible. The cold pressure method has been found to be exceptionally satisfactory for such unions. However, the peripheral edge of the union is exposed to atmosphere, and the metal is closely associated in a solid phase bond under atmospheric conditions along this peripheral edge. By tightly clamping the clamp member 15 around the flange, the atmosphere can be effectively sealed away from the union, but it has been found that if the clamp member is made of insulation material, or lined with insulation material, there is no possibility for the clamp member to transport electrons from one virgin metal to the other around the surface of the flange, and, consequently, corrosion is materially reduced. The flow of electrons directly through the union is within the body of the material, and is not subjected to atmospheric conditions. This protection against corrosion by the combined action of sealing out atmospheric conditions, and insulating the surface to inhibit or prevent the flow of electrons, has been found to be execptionally valuable.

In the Figure 6 a double ended terminal member of improved design, and made by an improved method, is illustrated as one type of terminal which may be employed in the improved method set forth herein for joining terminals to wires and reinforcing the junction. The structure employed in the union is best illustrated in the Figure 8. In Figure 8 it will be seen that there is provided a stud 26 and an outer shell or sheath 28. A wire 27 is in position to be united with the stud 26, very similar to the position shown in Figure 1 for two wires. In fact, the stud 26 may be considered to be a short wire. The terminal 25 and the wire 27 are joined as described with respect to the wires 10 and 11, and the sheath 28 is folded over as if it were one-half of the shell 12. The result is as shown in Figure 9 wherein a flange 29 has been produced and the sheath 28 folded down over the flange. A strong mechanical reinforcement is thus provided to assure the permanent union of the members in the flange 29, and to relieve the stresses which would normally have to be borne by the union in the flange 29.

The cross-hatching in the drawings of the various unions shown in Figures 3, 4, 5, and 9 is stopped at the symmetrical center of the flanges, although in reality there would be a solid phase bond of the metals in an indefinite pattern which cannot be properly shown by cross-hatching in a drawing of this type.

In Figure 10 there is illustrated a single terminal 24 having a sheath ring 30 mechanically folded upon the terminal. If desired, a few isolated spots of the sheath ring 30 and the terminal 24 may be further bonded, such as by cold pressure. The sheath ring 30 may be either metal, insulation, or metal lined with insulation, as desired according to the principles set forth above. In the drawings, it is illustrated as being metal.

In Figure 12 of the drawing, the completed union of a wire 31 with the terminal 24, to produce a flange 32 reinforced by the folded sheath ring 30, is illustrated.

Although the invention has been described in its preferred form with a certain degree of particularity, it is understood that the present disclosure of the preferred form has been made only by way of example and that numerous changes and the details of construction and the combination and arrangement of parts may be resorted to without departing from the spirit and the scope of the invention as hereinafter claimed.

What is claimed is:

1. A union of metal members in end-to-end relationship, comprising, a butt union of two metallic members wherein the structure of the two members is flared laterally as a flange thereby presenting a peripheral edge of the fused metals, said fused structures providing a first bond of union between the two metallic members, and a secondary bond member comprising a metal sheath uniting the two metal members and bridging over said flange to interfere with separation thereof in any direction.

2. A union of metal members in end-to-end relationship, comprising, a butt union of two metallic members wherein the structure of the two members is flared laterally as a flange, and a sheath member clipped tightly over the flange with a grip action interfering with separation of the members in any direction, said sheath member covering the peripheral edge of the flange air tight.

3. A union of metal members in end-to-end relationship, comprising, a butt union of two metallic members wherein the structure of the two members is flared laterally as a flange, and a sheath member clipped tightly over the flange with a grip action interfering with separation of the members in any direction, said sheath member comprising a metal ring electrically insulated on the interior surface thereof and encasing the peripheral edge of the flange air tight.

4. In a union of a wire to a terminal body wherein a terminal body having a stud member and said wire are united by a cold pressure weld of the structures thereof into a common bond structure and flared laterally as a flange, the provision of a clamp member sheath locking said terminal body and wire in a clamp action bridging over said flange, said clamp member sheath comprising a separate metal ring electrically insulated on the interior surface thereof, said sheath gripping the terminal and passing over the flange to engage the area of the flange produced by the wire.

5. A union of a wire to a terminal body, comprising a terminal body having a substantially cylindrical shell, a stud member centrally of said shell, a wire, said stud member and wire united in a common bond structure and flared laterally as a flange, and said shell crimped over said flange to clamp the terminal body and wire with a mechanical bond.

6. A junction of members in end to end relationship, comprising a butt union of first and second members wherein the structure of the first and second members meets in a junction having a radial flange, the flange having first and second opposed portions integral with the first and second members respectively, and clamp means clipped tightly over the said first and second opposed portions of the flange to interfere with separation thereof in any direction.

7. A junction of members in end to end relationship, comprising, a butt union of first and second members wherein the structure of the first and second members meets in a junction having a radial flange, the flange having first and second opposed portions integral with the first and second members respectively, and clamp means clipped tightly over the said first and second opposed portions of the flange to interfere with separation thereof in any direction, said clamp member covering the peripheral edge of the flange air tight.

8. A junction of members in end to end relationship, comprising, a butt union of first and second members wherein the structure of the first and second members meets in a junction having a radial flange, the flange having first and second opposed portions integral with the first and second members respectively, and clamp means clipped tightly over the said first and second opposed portions of the flange to interfere with separation thereof in any direction, said clamp member insulated to curtail the flow of electrical current between said clamp and the flange and encasing the peripheral edge of the flange air tight.

9. A junction of members in end to end relationship, comprising, a butt union of first and second members wherein the structure of the first and second members meets in a junction having a radial flange, the flange having first and second opposed portions integral with the first and second members respectively, and clamp means clipped tightly over the said first and second opposed portions of the flange to interfere with separation thereof in any direction, said clamp member comprising a metal ring electrically insulated on the interior surface thereof and encasing the peripheral edge of the flange air tight.

10. A union of a wire to a terminal body, comprising, a terminal body having a stud member, a wire, said stud member and wire meeting in a junction having a radial flange, the flange having first and second opposed portions integral with the stud and wire respectively, and a clamp member sheath locking said stud and wire in a clamp action by bridging over the first and second opposed portions to interfere with separation thereof in any direction.

11. A union of a wire to a terminal body, comprising, a terminal body having a stud member, a wire, said stud member and wire meeting in a junction having a radial flange, the flange having first and second opposed portions integral with the stud and wire respectively, and a clamp member sheath locking said stud and wire in a clamp action by bridging over the first and second opposed portions to interfere with separation thereof in any direction, said clamp member sheath covering the peripheral edge of the flange air tight.

12. A union of a wire to a terminal body, comprising, a terminal body having a stud member, a wire, said stud member and wire meeting in a junction having a radial flange, the flange having first and second opposed portions integral with the stud and wire respectively, and a clamp member sheath locking said stud and wire in a clamp action by bridging over the first and second opposed portions to interfere with separation thereof in any direction, said clamp member insulated to curtail the flow of electrical current between said clamp and the flange and encasing the peripheral edge of the flange air tight.

References Cited in the file of this patent

UNITED STATES PATENTS

| | | |
|---|---|---|
| 1,977,846 | Febrey | Oct. 23, 1934 |
| 2,160,422 | Shipman | May 20, 1939 |
| 2,447,085 | Odlum | Aug. 17, 1948 |